(No Model.)
2 Sheets—Sheet 1.
E. NEFF.
VEHICLE SPRING.
No. 430,745. Patented June 24, 1890.
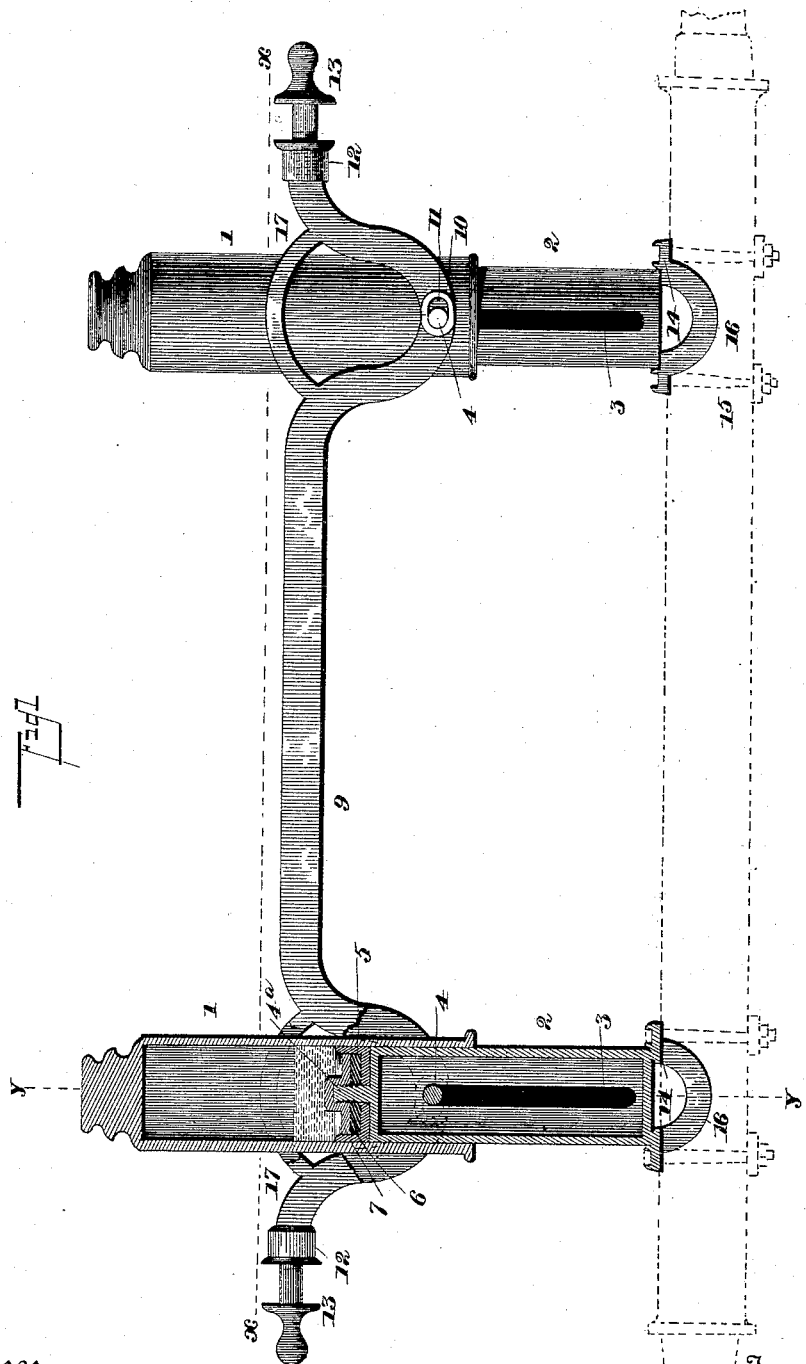
Witnesses
John Imrie
Wm. Bagger
Inventor
Elijah Neff
By his Attorneys
C. A. Snow & Co.

(No Model.) 2 Sheets—Sheet 2.
E. NEFF.
VEHICLE SPRING.
No. 430,745. Patented June 24, 1890.
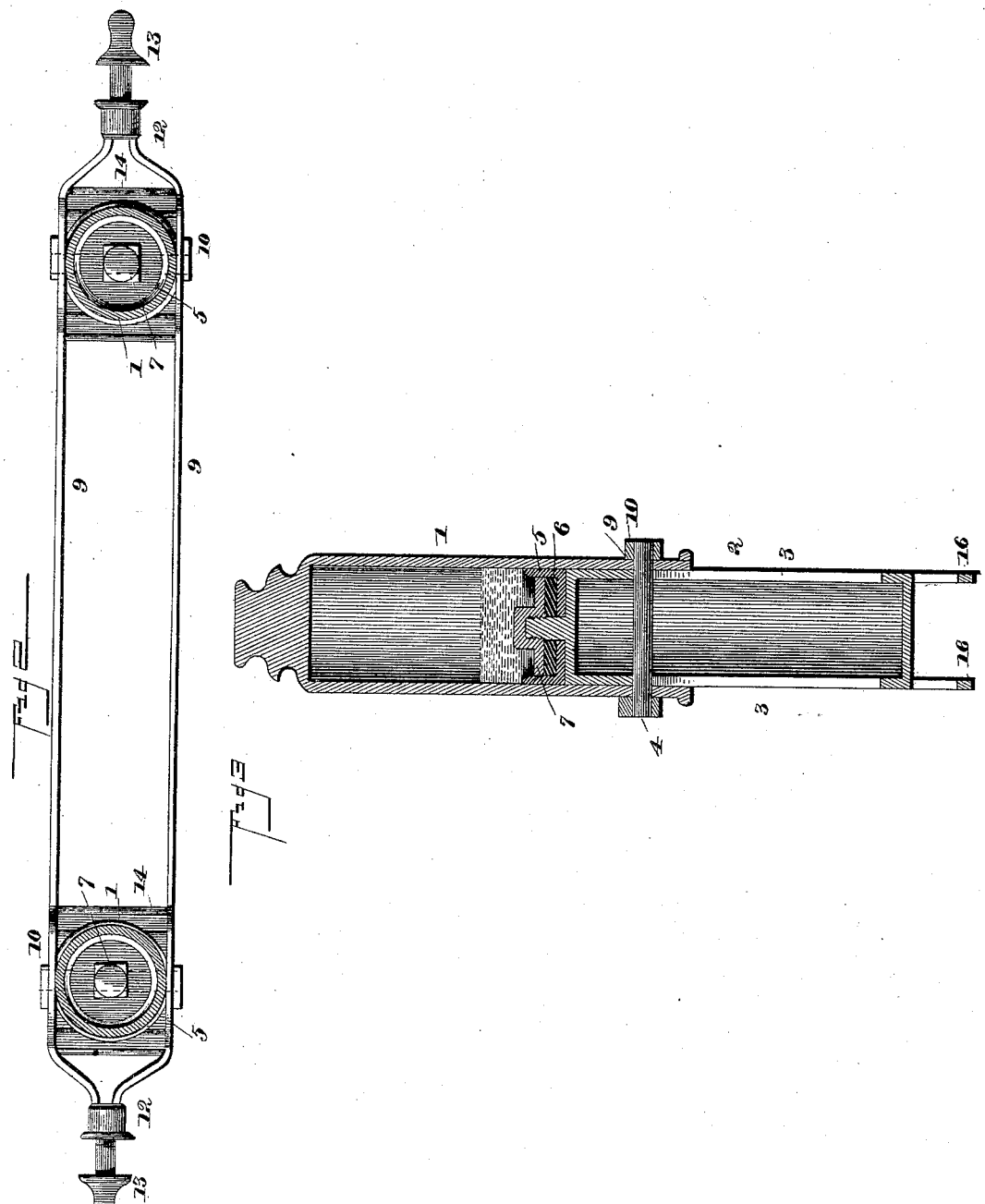
Witnesses
John Imirie
Wm. Bagger
Inventor
Elijah Neff
By his Attorneys
C. A. Snow & Co.

UNITED STATES PATENT OFFICE.

ELIJAH NEFF, OF ROCHESTER, INDIANA.

VEHICLE-SPRING.

SPECIFICATION forming part of Letters Patent No. 430,745, dated June 24, 1890.

Application filed March 13, 1890. Serial No. 343,720. (No model.)

*To all whom it may concern:*

Be it known that I, ELIJAH NEFF, a citizen of the United States, residing at Rochester, in the county of Fulton and State of Indiana, have invented a new and useful Vehicle-Spring, of which the following is a specification.

This invention relates to vehicle-springs; and it has for its object to construct what may be known as pneumatic vehicle-springs, the detailed construction and arrangement of which will be hereinafter fully described, and particularly pointed out in the claims.

In the drawings hereto annexed, Figure 1 is a side elevation of a pair of pneumatic springs embodying my improvements, said view being taken, partly in section, to show the interior construction. Fig. 2 is a horizontal sectional view, taken on the line $x\,x$ in Fig. 1. Fig. 3 is a sectional view taken on the line $y\,y$ in Fig. 1.

Like numerals of reference indicate like parts in all the figures.

Each of my improved springs comprises an upper and a lower cylinder, designated, respectively, by 1 and 2, the latter fitting within the former, as will be clearly seen by reference to Figs. 1 and 3 of the drawings.

The cylinder 1 is closed at its upper end, and the cylinder 2 is preferably closed at its upper and lower ends, but is provided in diametrically-opposite sides with vertical slots 3 to accommodate the bolts 4, which extend transversely through the upper cylinder 1 near the lower end of the latter. The said upper and lower cylinders are thereby coupled or connected together. The upper ends of the lower or inner cylinders are provided with upwardly-extending screw-threaded plugs $4^a$, over which are adjusted the crimped leather packings 5, which are cup-shaped, as shown, the rubber packing-disks 6 and the clamping-nuts 7. It will be seen that by tightening the latter the rubber or elastic packing-disks are expanded to force the leather packings into contact with the walls of the cylinder 1, thus making a very close and effective packing. Oil or other lubricating material is introduced into the cylinder 1 above the packing for the purpose of lubricating the said packing and making it absolutely air-tight, it being necessary for the lubricating material to escape before the air contained in the upper end of the cylinder 1 can escape between the walls of the latter and the packing.

The individual springs, constructed as herein described, are connected in pairs by means of the frames 9, which are provided near their ends with U-shaped yokes 10, having elliptical slots or openings 11 to receive the ends of the connecting-bolts 4, to which latter a slight vibratory movement is thus permitted. The ends of the frames 9 are provided with screw-threaded thimbles 12, to receive the ends of the bolts 13, by means of which latter connection is made with the body-loops of the vehicle to which the invention is to be applied. The individual springs, or, more properly, the lower cylinder or piston 2 of each individual spring, is provided at its lower end with laterally-extending brackets 14, forming seats for clips 15, by means of which the said springs may be mounted upon the axles or head-blocks of the vehicle. Each of the said cylinders or pistons 2 is also provided with downwardly-extending guards or flanges 16 to assist in holding it securely in position and to prevent it from rocking or tilting. The U-shaped arches 10 of each of the frames 9 are connected by means of bridge-pieces 17, serving simply as guards to retain the spring-cylinders in position.

From the foregoing description, taken in connection with the drawings hereto annexed, the operation and advantages of my invention will be readily understood. In operation the weight of the body of the vehicle is supported upon the frames 9 and through the latter and the connecting-bolts 4 upon the cylinders 1. When the latter by the weight upon the body of the vehicle are forced in a downward direction, the air in the said cylinders 1 is compressed by the pistons or cylinders 2, and sufficient elasticity is thus attained to prevent jolting. It will be observed that the individual springs are capable of a limited lateral movement sufficient to avoid breakage. It will also be seen that upon the removal of a portion of the load the air within the cylinders 1 will expand, forcing the said cylinders and the wagon-body in an upward direction.

The general construction of my improved pneumatic springs is exceedingly simple and inexpensive, and leakage of air from the cylinders 1 is rendered practically impossible by the packing herein described. My improved springs may be conveniently attached to the running-gear of vehicles of ordinary construction, and will be found simple, durable, and efficient.

It is obvious that by properly modifying the general construction of the device my improved springs may be reversed and the air-cylinder be provided with means for attachment to the running-gear of the vehicle. I reserve the right to this and to any other modifications which may be resorted to without departing from the spirit of my invention.

Having thus described my invention, what I claim is—

1. A pneumatic vehicle-spring comprising an air-cylinder closed at its outer end, a piston working in said cylinder, and provided with suitable packing, and lubricating material forming a layer above the said packing, substantially as set forth.

2. A vehicle-spring comprising an air-cylinder closed at its outer end, a cylindrical piston working in the same and provided with suitable packing, and having vertically-slotted sides and a transverse connecting-bolt, substantially as set forth.

3. In a pneumatic vehicle-spring, the combination of an air-cylinder closed at its outer end, a cylindrical piston having vertically-slotted sides and provided with a screw-threaded lug, packing mounted upon the latter, a clamping-nut, and a transverse bolt connecting the air-cylinder and the piston, substantially as set forth.

4. In a pneumatic vehicle-spring, the combination, with an air-cylinder closed at its outer end, of a cylindrical piston having a screw-threaded lug at its outer end, a crimped leather packing mounted upon the said lug, a rubber or elastic packing-disk arranged upon the said lug above the said elastic packing-disk, a clamping-nut, and a transverse bolt connecting the air-cylinder and the piston, substantially as set forth.

5. In a pneumatic vehicle-spring, the combination, with a pair of air-cylinders, of the pistons working in the same, the transverse connecting-bolts, and the connecting-frame having elliptical openings to receive the ends of the said connecting-bolts, substantially as set forth.

6. In a pneumatic vehicle-spring, the combination of the air-cylinders, the cylinders or pistons working in the same, the transverse connecting-bolts, and the connecting-frames having U-shaped brackets provided with oblong openings to receive the ends of said connecting-bolts, substantially as set forth.

7. In a pneumatic vehicle-spring, the combination of the air-cylinders, the cylindrical pistons provided at their lower ends with clip-seats and downwardly-extending flanges, the transverse connecting-bolts and the connecting-frames having oblong openings to receive the ends of said bolts, substantially as set forth.

8. In a pneumatic vehicle-spring, the combination of the air-cylinders, the pistons working therein, the transverse connecting-bolts, the connecting-frames having slots to receive the ends of said bolts, and the thimbles at the ends of said connecting-frames adapted to receive bolts, by means of which the ends of said connecting-frames may be connected with the body-loops, substantially as set forth.

9. In a pneumatic vehicle-spring, the combination, with the air-cylinders, the pistons, and the transverse connecting-bolts, of the connecting-frames having U-shaped yokes provided with slots to receive the ends of said connecting-bolts, the bridge-pieces connecting the ends of said yokes, the screw-threaded pintles at the ends of said connecting-frames, and the bolts to connect the latter with the body-loops, substantially as set forth.

10. In a pneumatic vehicle-spring, the combination of the air-cylinders closed at their upper ends and provided near their lower ends with transverse bolts extended into slots and suitable connecting-frames, the cylindrical pistons working in said air-cylinders, and having vertically-slotted sides to receive the transverse connecting-bolts, means for connecting the said pistons with the running-gear of a vehicle, and mechanism for connecting the ends of the connecting-frames with the body-loops of the vehicle, substantially as set forth.

11. In a pneumatic vehicle-spring, the combination of the air-cylinders, the cylindrical pistons provided with suitable packing at their upper ends, the layers of lubricating material above said packings, the laterally-extending clip-seats at the lower ends of the cylindrical pistons, the downwardly-extending flanges of the latter, the transverse connecting-bolts, the connecting-frames having slots to receive the ends of the connecting-bolts, the screw-threaded thimbles at the ends of said connecting-frames, and the bolts adapted to be adjusted in said thimbles and to connect the frames with the body-loops of a vehicle, substantially as and for the purpose set forth.

In testimony that I claim the foregoing as my own I have hereto affixed my signature in presence of two witnesses.

ELIJAH NEFF.

Witnesses:
ALONZO L. RANNELLS,
JAMES J. MCLAUGHLIN.